United States Patent
Greisson et al.

(10) Patent No.: US 9,065,920 B2
(45) Date of Patent: Jun. 23, 2015

(54) METHOD AND APPARATUS PERTAINING TO PRESENTING INCOMING-CALL IDENTIFIERS

(75) Inventors: Erik Artur Greisson, Malmö (SE); Gregory Jason Fields, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 7 days.

(21) Appl. No.: 13/405,764

(22) Filed: Feb. 27, 2012

(65) Prior Publication Data

US 2013/0223604 A1 Aug. 29, 2013

(51) Int. Cl.
- *H04M 1/56* (2006.01)
- *H04M 1/57* (2006.01)

(52) U.S. Cl.
CPC .......... *H04M 1/575* (2013.01); *H04M 2250/22* (2013.01)

(58) Field of Classification Search
USPC ............ 379/142.01, 142.04, 142.06, 167.12, 379/207.16, 355.1, 88.21, 201.04
See application file for complete search history.

(56) References Cited

U.S. PATENT DOCUMENTS

| | | | | |
|---|---|---|---|---|
| 4,924,496 A | * | 5/1990 | Figa et al. | 379/142.06 |
| 5,894,504 A | * | 4/1999 | Alfred et al. | 379/88.13 |
| 5,907,604 A | * | 5/1999 | Hsu | 379/142.06 |
| 8,081,992 B2 | * | 12/2011 | Book | 455/457 |
| 2006/0291635 A1 | | 12/2006 | Sun et al. | |
| 2010/0203874 A1 | | 8/2010 | Scott et al. | |
| 2011/0034156 A1 | | 2/2011 | Gatti et al. | |

FOREIGN PATENT DOCUMENTS

EP 2222061 A2 8/2010

OTHER PUBLICATIONS

Extended European Search Report from related European Patent Application No. 13157076.4 dated Jun. 28, 2013; 7 pages.
Canadian Office Action from related Canadian Patent Application No. 2,807,781 dated Aug. 14, 2014; 3 pages.

\* cited by examiner

*Primary Examiner* — Yosef K Laekemariam
(74) *Attorney, Agent, or Firm* — Fleit Gibbons Gutman Bongini & Bianco P.L.

(57) ABSTRACT

A control circuit determines a contact number as corresponds to an incoming call, accesses a contacts list to identify at least one contact identifier as corresponds to that contact number, and then makes a corresponding decision and/or takes a corresponding action regarding the display of more than one contact identifier as corresponds to the contact number and/or a numeric representation of how many contact identifiers correspond to the contact number. This can comprise simultaneously displaying at least two contact identifiers as correspond to the incoming contact number. These multiple identifiers can be displayed in a predetermined order. For example, earlier-entered contact identifiers may be presented ahead of later-entered contact identifiers. By another approach, the foregoing can comprise displaying only one of the candidate contact identifiers along with a numeric representation of how many contact identifiers correspond to the contact number.

10 Claims, 3 Drawing Sheets

METHOD AND APPARATUS PERTAINING TO PRESENTING INCOMING-CALL IDENTIFIERS

FIELD OF TECHNOLOGY

The present disclosure relates to electronic communications devices and more particularly to the presentation of identifying information for incoming calls.

BACKGROUND

Two-way communications devices are well known in the art. This includes a variety of wireless two-way communications devices such as, but not limited to, so-called smartphones.

So-called caller ID (short for "identification") is also known in the art. Infrastructure signaling to establish calls can include informational content regarding, for example, the telephone number (and sometimes other identifying information) of the calling device (i.e., the device being used to establish a call). The receiving device can then display part or all of this received informational content to provide information to the user identifying, at least to some extent, the party seeking to establish the call. In some cases the receiving device can utilize this informational content to access, for example, a locally-stored contacts list to obtain other identifying content, such as a name for the calling party and/or an identifying thumbnail photographic image of the calling party.

Unfortunately, such practices typically rely upon the telephone number of the device that seeks to establish the call rather than any specific information about who, in particular, might be using that device to establish the call. As a result, ambiguous, confusing, or even misleading identifying information may be presented to the user when the telephone number associated with the incoming call is associated with more than one person for whatever reason.

Accordingly, improvements in devices with caller-ID display capabilities are desirable.

DETAILED DESCRIPTION

Figure 1:
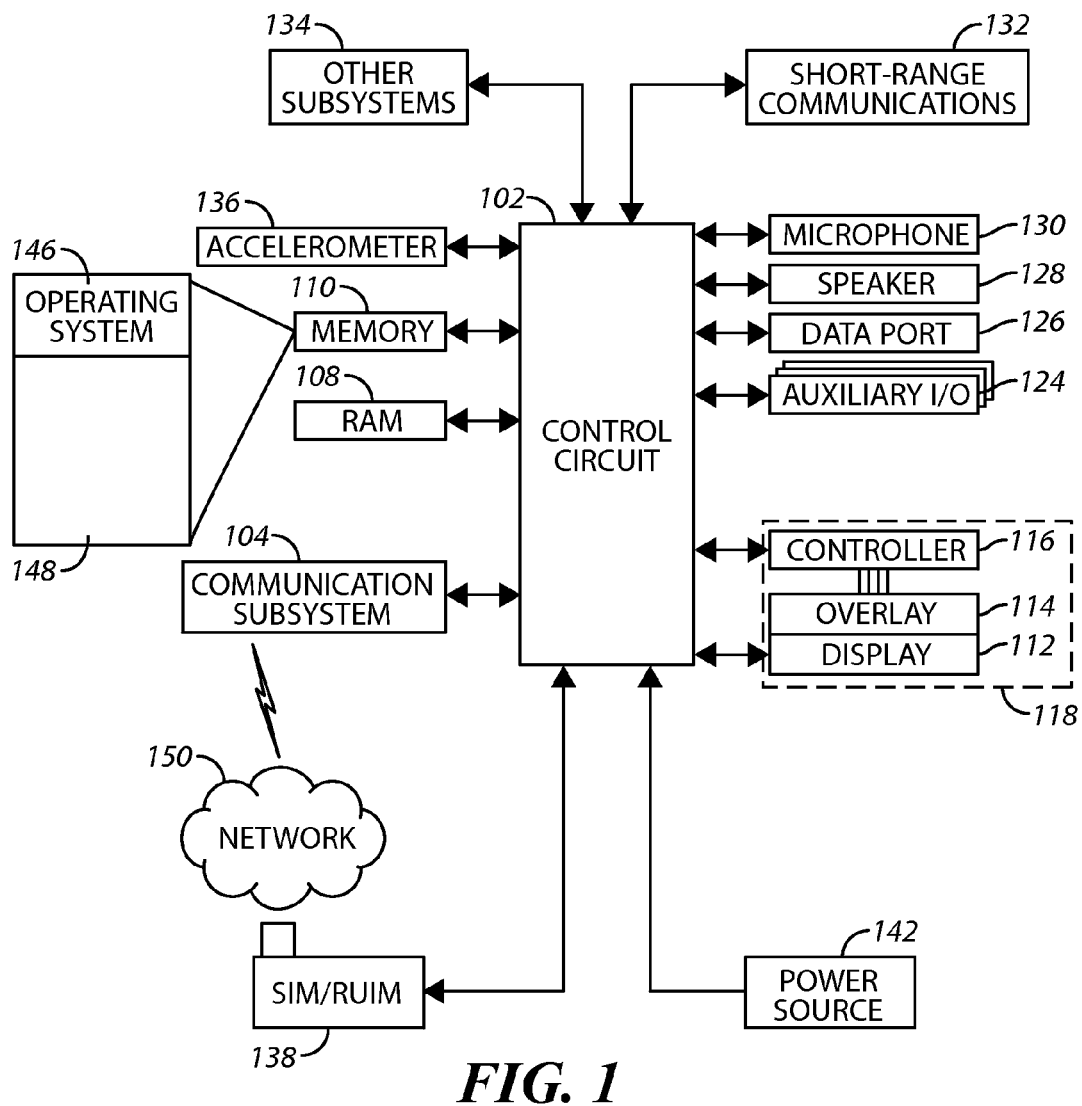
FIG. 1 is a block diagram in accordance with the disclosure.

The following describes an apparatus and method pertaining to a control circuit that determines a contact number as corresponds to an incoming call, accesses a contacts list to identify at least one contact identifier as corresponds to that contact number, and then makes a corresponding decision and/or takes a corresponding action regarding the display of more than one contact identifier as corresponds to the contact number and/or a numeric representation of how many contact identifiers correspond to the contact number.

By one approach, the foregoing can comprise simultaneously displaying at least two contact identifiers as correspond to the incoming contact number. If desired, these multiple contact identifiers can be displayed in a predetermined order. For example, earlier-entered contact identifiers may be presented ahead of later-entered contact identifiers.

By another approach, the foregoing can comprise displaying only one of the candidate contact identifiers along with a numeric representation of how many contact identifiers correspond to the contact number. If desired, in such a case the one displayed contact identifier can comprise the oldest available contact identifier for this contact number.

These teachings are highly flexible in practice and will accommodate a wide variety of identifier types including, but not limited to, textual content as well as graphic, image-based content (such as photographic thumbnail images). The approaches disclosed herein are also readily employed in conjunction with existing caller-ID techniques and existing contact list practices and hence can serve to significantly leverage the continued and increased value and viability of such practices. These teachings are also highly scalable and can serve in a variety of application settings and with essentially any type of contact information and any number of contact identifiers.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Referring to FIG. 1, an exemplary portable electronic device includes a control circuit 102 (such as a properly programmed processor) that controls the overall operation of the portable electronic device. Communication functions, including data and voice communications, are performed through a communication subsystem 104. The communication subsystem receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device.

The control circuit 102 interacts with other elements, such as a Random Access Memory (RAM) 108, a memory 110, a display 112 with a touch-sensitive overlay 114 operably coupled to an electronic controller 116 that together comprise an optional touch-sensitive display 118 (sometimes referred to herein as a touch-screen display), an auxiliary input/output (I/O) subsystem 124 (which might comprise, for example, a physical keyboard such as a full QWERTY keyboard), a data port 126, a speaker 128, a microphone 130, a short-range communication subsystem 132 (such as, for example, a Bluetooth-based short-range communication subsystem), and other device subsystems 134 of choice.

One or more user interfaces are provided. Input via a graphical user interface is provided via the touch-sensitive overlay 114. The control circuit 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the control circuit 102.

The control circuit 102 may interact with an accelerometer 136 that may be utilized to detect direction of gravitational forces or gravity-induced reaction forces.

To identify a subscriber for network access, the portable electronic device may utilize a Subscriber Identity Module or a Removable User Identity Module (SIM/RUIM) card 138 for communication with a network, such as the wireless network 150. Alternatively, user identification information may be programmed into the memory 110.

The portable electronic device includes an operating system 146 and software programs, applications, or components 148 that are executed by the control circuit 102 and are typically stored in a persistent, updatable store such as the memory 110. Additional applications or programs may be loaded onto the portable electronic device through the wireless network 150, the auxiliary I/O subsystem 124, the data port 126, the short-range communications subsystem 132, or any other suitable subsystem 134. The memory 110 may comprise a non-transitory storage media that stores executable code that, when executed, causes the control circuit 102 to carry out one or more of the functions or actions described herein.

A received signal such as a text message, an e-mail message, or web page download is processed by the communication subsystem and input to the control circuit 102. The control circuit 102 processes the received signal for output to the display 112 and/or to the auxiliary I/O subsystem 124. A subscriber may generate data items, for example e-mail messages, that may be transmitted over the wireless network 150 through the communication subsystem. For voice communications, the overall operation of the portable electronic device is similar. The speaker 128 outputs audible information converted from electrical signals and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. One or more touches, also known as touch contacts, touch events, or sometimes gestures may be detected by the touch-sensitive display 118. The control circuit 102 may determine attributes of the touch, including a location, direction, and/or extent of a touch. Touch location data may include data for an area of contact or data for a single point of contact, such as a point at or near a center of the area of contact.

Figure 2:
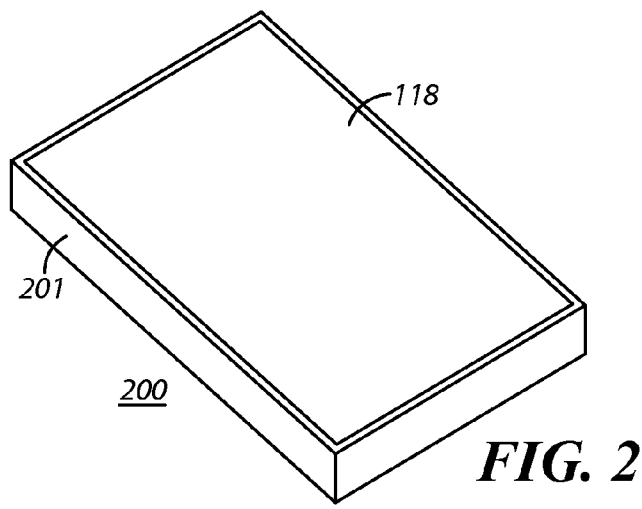
FIG. 2 is a perspective view in accordance with the disclosure.

Referring to FIG. 2, for the sake of illustration but without intending any limitations in these regards, the following description will presume that the portable electronic device comprises a portable two-way wireless communications device 200 such as a so-called smartphone. Such a device 200 often comprises a housing 201 to contain the foregoing components including the aforementioned touch-screen display 118.

Figure 3:
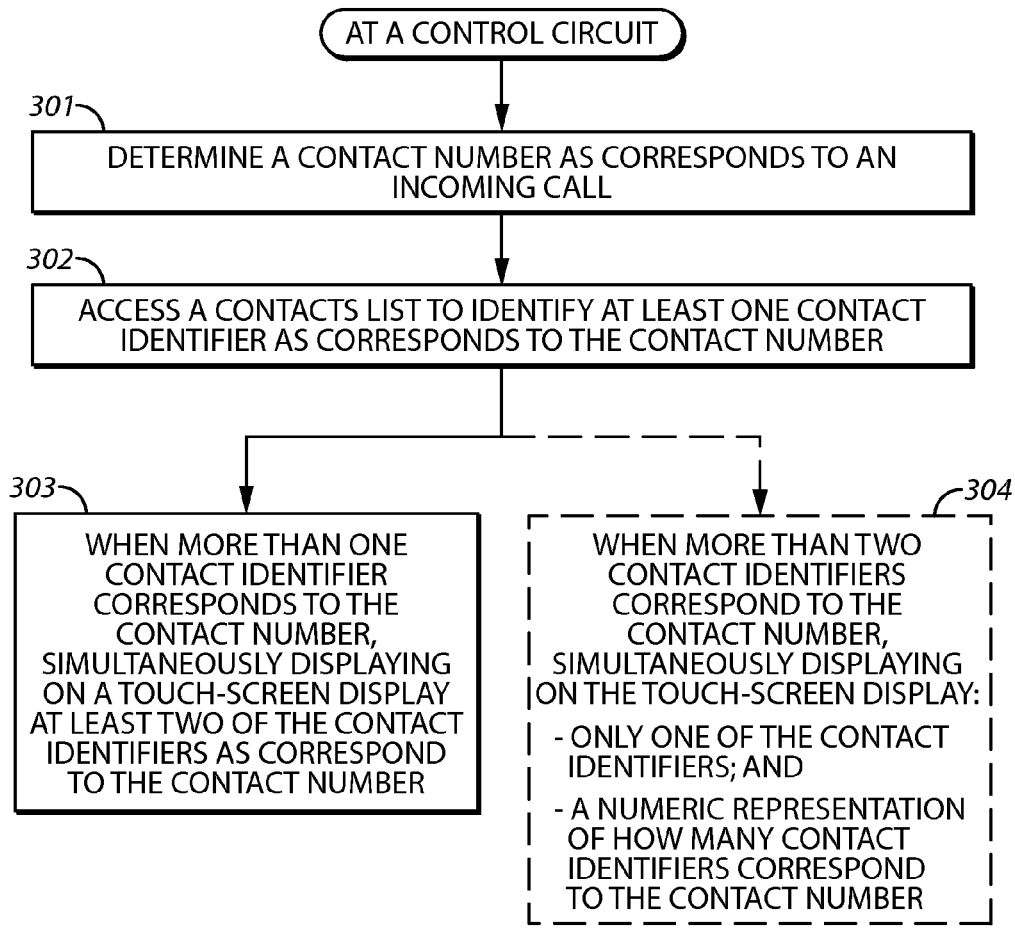
FIG. 3 is a flow diagram in accordance with the disclosure.

Referring to FIG. 3, the control circuit 102, upon detecting an incoming call (via, for example, a wireless transceiver such as the aforementioned communication subsystem 104), determines 301 a contact number as corresponds to that incoming call. This can comprise, for example, recovering the contact number (such as a telephone number) that accompanies the ringing signaling or other call-setup signaling as characterizes a given application setting. There are various ways known in the art to obtain such a contact number and the present teachings are not particularly sensitive as to any particular choices in these regards.

The control circuit 102 then accesses 302 a contacts list (as stored, for example, in the aforementioned memory 110) to identify the contact identifiers that correspond to the recovered contact number. This can comprise, for example, automatically searching one or more lists of contacts that are locally stored at this communications device using part or all of the recovered contact number as a search query. When this search identifies only a single contact as corresponding to the contact number, the control circuit 102 can display the identifying information for that single contact as per ordinary practice in these regards.

Figure 4:
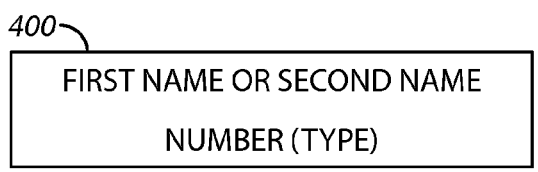
FIG. 4 is a screen shot detail view in accordance with the disclosure.

When, however, more than one contact identifier corresponds to the contact number, by one approach the control circuit 102 can simultaneously display 303 at least two of the contact identifiers as correspond to the contact number on the touch-screen display 118. FIG. 4 provides an illustrative schematic example in these regards when there are two contact identifiers that correspond to the contact number. In this example, the displayed identifying information 400 includes a name of a first contact (i.e., "First Name") and the name of a second contact (i.e., "Second Name") joined by an "or." If desired, and as shown, the displayed identifying information 400 can also include the calling telephone number (i.e., "Number") and an indication of the type or location of calling platform (such as, for example, "mobile," "home," "work," and so forth).

So configured, a student who receives a phone call from someone at his school dormitory room that is shared with two other persons will cause the names of both of those two persons to be displayed (presuming the correlating information is present in the student's contacts list). This information, in turn, can help to lighten the student's cognitive loading and can help the student to make a better-informed decision about whether and/or how to answer the call.

Figure 5:
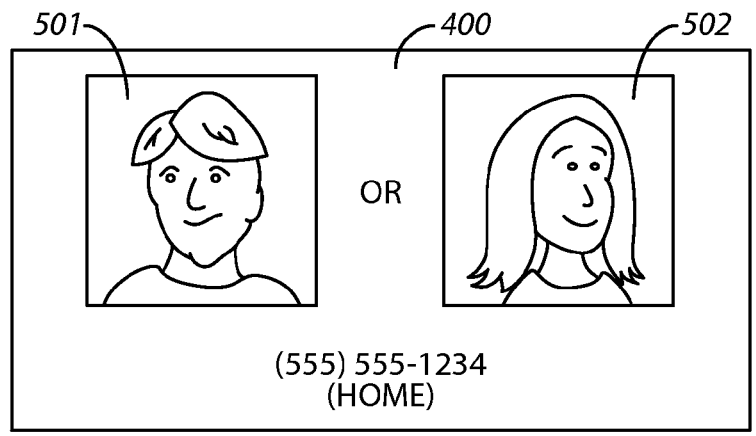
FIG. 5 is a screen shot detail view in accordance with the disclosure.

In the example just provided the names of the contacts served as the displayed contact information. These teachings will accommodate a variety of practices in these regards, however. As one illustrative example in these regards, and referring to FIG. 5, small photographic images 501 and 502 (recovered, for example, from the aforementioned contacts list) can serve as the identifying information 400 for the two contacts of this example. If desired, the names of the contacts can also be presented in combination with such images.

Figure 6:
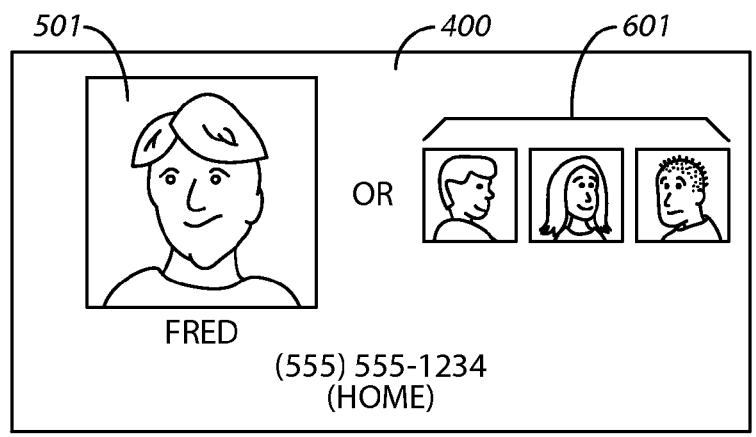
FIG. 6 is a screen shot detail view in accordance with the disclosure.

FIG. 6 provides another illustrative example in these regards. In this example there are four contacts that correspond to the contact number. The name and a relatively large thumbnail image 501 are displayed for one of the contacts and only a smaller thumbnail image 601 is displayed for each of the remaining contacts. Again, the word "or" further serves to communicate that this particular contact number corresponds to a number of different contacts.

By one approach, the particular contact information that is emphasized, and/or the presentation order for a plurality of contacts, can be predetermined. By one approach, this can comprise emphasizing and/or ordering the contacts such that an earlier-entered contact identifier is presented ahead of a later-entered contact identifier. This emphasis/ordering can also be made selectively settable by the user via an appropriate corresponding wizard, flag, or other suitable user interface if desired.

Figure 7:
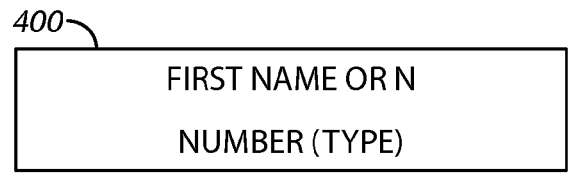
FIG. 7 is a screen shot detail view in accordance with the disclosure.

It is of course possible that the number of contacts for a given contact number can exceed a useful number of contacts to display. A given display, for example, may lack sufficient space to present in a useful way identifying information for each and every contact as corresponds to a given contact number. It may also be deemed inappropriate in a given application setting to expose the user to too many discrete items of identifying information. With reference to FIG. 3 and FIG. 7, this process can include an optional response to address such a circumstance and concern.

In particular, when more than a predetermined number of contact identifiers (such as, for example, more than two contact identifiers) correspond to the contact number, the control circuit 102 can simultaneously display 304 only one of the contact identifiers along with a numeric representation of how many contact identifiers correspond to the contact number (in FIG. 7, "N" serves as this numeric representation and can comprise essentially any useful integer).

As described above, and if desired, the particular contact identifier so displayed can be selected pursuant to a predetermined selection process. As one example, the one contact identifier so displayed can be the oldest available contact identifier for the contact number at issue.

So configured, these teachings provide for various ways to help a user of a communications device understand when a given incoming call may be from any of a number of different parties. Depending upon the implementation and/or the number of possible contacts that may be associated with a given contact number, these teachings can also provide useful information regarding the specific candidates who may be calling and/or the number of possible candidates for a given incoming call.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. An apparatus comprising:
    a wireless transceiver;
    a touch-screen display;
    a memory having a contacts list stored therein;
    a control circuit operably coupled to the touch-screen display, the memory, and the wireless transceiver and configured to:
        determine a contact number as corresponds to an incoming call via the wireless transceiver;
        accessing the contacts list to identify at least one contact identifier as corresponds to the contact number;
        when more than one contact identifier corresponds to the contact number, displaying a numeric representation of how many contact identifiers correspond to the contact number and simultaneously displaying on the touch-screen display at least two of the contact identifiers as correspond to the contact number by simultaneously displaying the at least two contact identifiers in a predetermined order such that an earlier-entered contact identifier is presented ahead of a later-entered contact identifier.

2. The apparatus of claim 1 wherein the contact number comprises a telephone number.

3. The apparatus of claim 1 further comprising, when more than two contact identifiers correspond to the contact number, simultaneously displaying:
    less than all of the contact identifiers; and
    a numeric representation of how many contact identifiers correspond to the contact number.

4. The apparatus of claim 3 wherein displaying less than all of the contact identifiers comprises displaying only an oldest available contact identifier for this contact number.

5. A method comprising:
    at a control circuit:
        determining a contact number as corresponds to an incoming call;
        accessing a contacts list to identify at least one contact identifier as corresponds to the contact number;
        when more than one contact identifier corresponds to the contact number, displaying a numeric representation of how many contact identifiers correspond to the contact number and simultaneously displaying on a touch-screen display at least two of the contact identifiers as correspond to the contact number by simultaneously displaying the at least two contact identifiers in a predetermined order such that an earlier-entered contact identifier is presented ahead of a later-entered contact identifier.

6. The method of claim 5 wherein the contact number comprises a telephone number.

7. The method of claim 5 further comprising:
    when more than two contact identifiers correspond to the contact number, simultaneously displaying on the touch-screen display:
        less than all of the contact identifiers; and
        a numeric representation of how many contact identifiers correspond to the contact number.

8. The method of claim 7 wherein displaying less than all of the contact identifiers comprises displaying only an oldest available contact identifier for this contact number.

9. The method of claim 5 further comprising:
    when more than one contact identifier corresponds to the contact number, displaying on the touch-screen display a numeric representation of how many contact identifiers correspond to the contact number.

10. A non-transitory computer storage medium having instructions stored therein, which instructions, when executed by a processor, cause the processor to:
    determine a contact number as corresponds to an incoming call;
    access a contacts list to identify at least one contact identifier as corresponds to the contact number;
    when more than one contact identifier corresponds to the contact number, displaying a numeric representation of how many contact identifiers correspond to the contact number and simultaneously display on a touch-screen display at least two of the contact identifiers as correspond to the contact number by simultaneously displaying the at least two contact identifiers in a predetermined order such that an earlier-entered contact identifier is presented ahead of a later-entered contact identifier.

* * * * *